United States Patent
Campbell et al.

(10) Patent No.: US 7,391,298 B1
(45) Date of Patent: Jun. 24, 2008

(54) WIRELESS SYSTEM FOR MONITORING AND REACTING TO EVENTS AT A REMOTE LOCATION

(75) Inventors: Charles Alexander Campbell, The Woodlands, TX (US); George Jeffrey Rino, Houston, TX (US); Floyd Wayne Hayes, Houston, TX (US); James Dale Wix, Cypress, TX (US); Joseph John Rino, Alexandria, LA (US)

(73) Assignee: GEWA, LLC, Houston, TX (US)

( * ) Notice: Subject to any disclaimer, the term of this patent is extended or adjusted under 35 U.S.C. 154(b) by 0 days.

(21) Appl. No.: 11/746,542

(22) Filed: May 9, 2007

(51) Int. Cl.
  *G08B 9/00* (2006.01)
  *G06F 9/00* (2006.01)
  *G06F 15/16* (2006.01)
  *G06F 17/00* (2006.01)
(52) U.S. Cl. .................... 340/286.02; 726/11; 726/15
(58) Field of Classification Search ......... 340/541–567, 340/286.02; 700/2, 3; 726/3, 11, 15
See application file for complete search history.

(56) References Cited

U.S. PATENT DOCUMENTS

| | | | |
|---|---|---|---|
| 6,507,273 B1 * | 1/2003 | Chang et al. | 340/3.1 |
| 6,782,294 B2 * | 8/2004 | Reich et al. | 700/19 |
| 6,965,939 B2 * | 11/2005 | Cuomo et al. | 709/229 |
| 7,084,760 B2 * | 8/2006 | Himberger et al. | 340/540 |

* cited by examiner

*Primary Examiner*—Jennifer Mehmood
(74) *Attorney, Agent, or Firm*—Buskop Law Group, PC; Wendy Buskop

(57) ABSTRACT

A system for detecting, monitoring, and reacting to an event comprising: on premises surveillance equipment, an on premises wireless server, a cellular virtual private network in communication with the on premises wireless server, a router remote from the on premises surveillance equipment in communication with the cellular virtual private network and with a second network for directing data to at least one networked server, at least one client device, and computer instructions for enabling the at least one client device to connect to the at least one networked server.

35 Claims, 4 Drawing Sheets

to be used when existing monitoring systems fail due to mechanical error, user error, or natural disas-

WIRELESS SYSTEM FOR MONITORING AND REACTING TO EVENTS AT A REMOTE LOCATION

FIELD

The present embodiments relate to a wireless system for monitoring and reacting to events at a remote location.

BACKGROUND

A need exists for a system for monitoring a remote location in real time using wireless surveillance equipment that can be used to generate a contemporaneous reaction to events at the remote location.

A further need exists for a system that can monitor a remote location using a wide variety of surveillance equipment and react to events at the remote location using a wide variety of equipment, including video equipment, audio equipment, sound generation equipment, light generation equipment, water cannons, fire hoses, and other equipment and devices.

An additional need exists for a system that can monitor a remote location and react to events at that remote location that is entirely wireless and can be accessed by one or more users at any time, from any location, including remote locations.

The present embodiments meet these needs.

BRIEF DESCRIPTION OF THE DRAWINGS

The detailed description will be better understood in conjunction with the accompanying drawings as follows.

Figure 1:
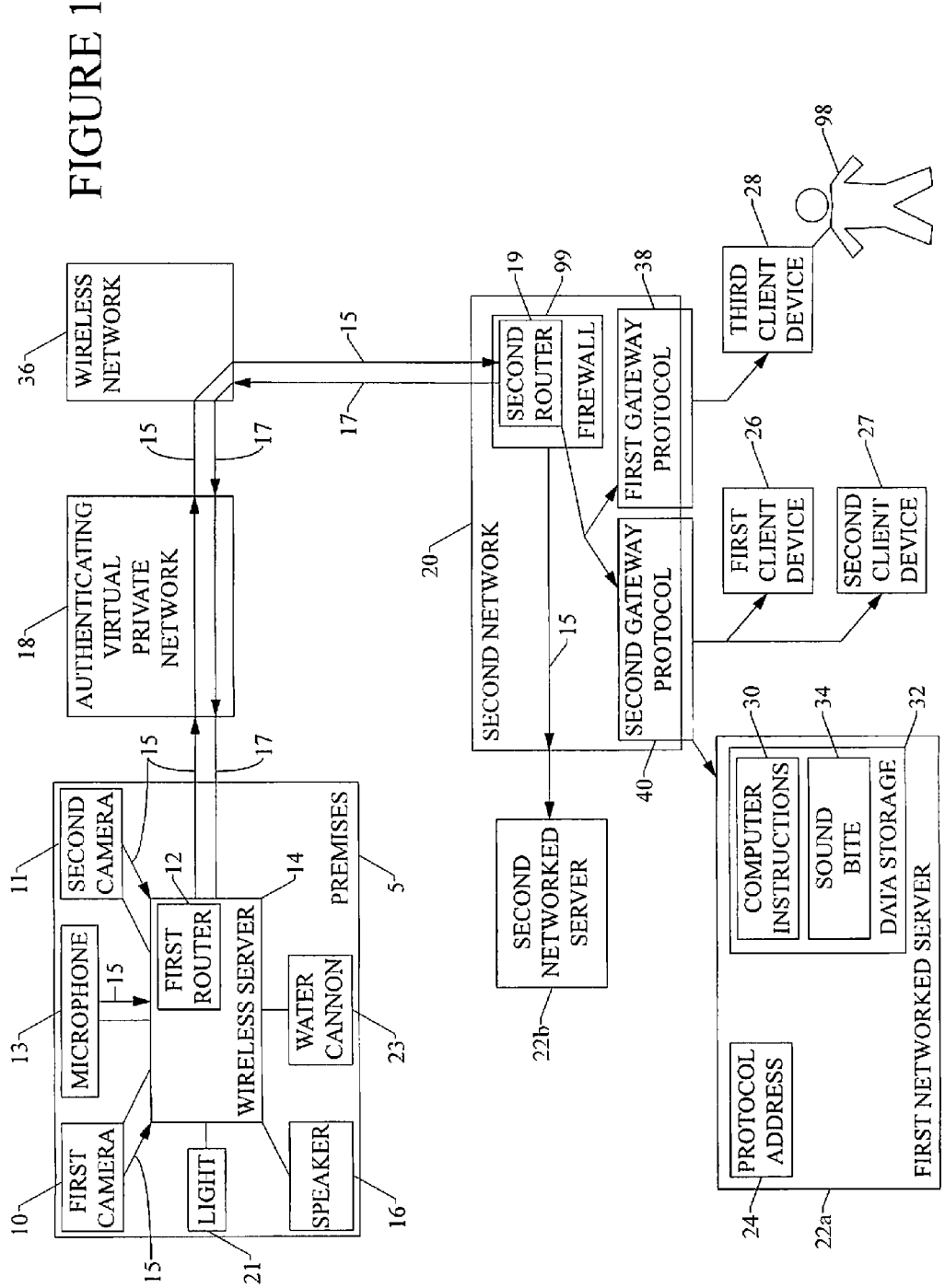
FIG. 1 depicts a diagram displaying the components of an embodiment of the present system relating to surveillance of a premises.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present system provides numerous advantages in numerous situations. For example, the present system can be used to monitor and verify the presence of rising waters, such as during a hurricane. If the present system had been installed in the City of New Orleans, along the levies, an individual remote to New Orleans could have viewed the rising waters on a real time basis, and transmitted the data to television and camera crews to advise local viewers about the situation and begin evacuation. The remote viewer could have called responsible authorities, such as President George Bush, and provided data and suggested plans of action.

Similarly, the present system allows general public access to the network, such as to monitor a situation, such as in a school or an airport.

Even though cameras exists now on freeways, along dams, and in similar areas where monitoring may be necessary, the general public does not possess access in the same manner that governmental and private observers do. Further, most existing cameras require hard wiring, while the present system allows the general public to access information from a remote location without the need for hard wiring to provide electricity, telephone, or internet access, due to the wireless or cellular nature of the present system.

The present system is therefore usable in situations where no hard wiring exists, or in impoverished or damaged areas lacking sufficient infrastructure to possess or utilize electrical, telephone, or internet wiring.

A particular advantage of the present system is that after an area has been damaged, such as by a natural disaster, the present system can be promptly and efficiently installed for further remote, wireless monitoring of the area, which can prevent the loss of life from remaining dangers, such as flood waters, and can prevent theft, looting, and destruction of property when phones and hard wired surveillance equipment is inoperable.

Persons trapped in damaged areas, such as post disaster areas, without hard wired infrastructure in place due to the damage, can be detected by the present system through monitoring over a cellular, wireless, or satellite network.

The present system can be particularly useful in areas where tornadoes are prevalent, therefore lacking strong infrastructure, and can be used both to monitor storms for research purposes and to prevent or mitigate loss of lives and property damage.

The present system can be used for monitoring a hunting range, permitting remote individuals to monitor deer at deer stands to determine species in the area and related information, such as whether the deer present are 12 point or larger. The present system can also detect hunting accidents in remote locations and allow responses to situations that could otherwise prove fatal.

The present system is further usable to monitor construction areas of single family homes, when a construction site is at great risk of vandalism and theft, but when the electricity, hard wiring, and internet connectivity have not yet been installed or activated.

The present system is wireless, enabling one or more users from one or more remote locations to monitor a location, which can include such as a structure, a compound, a vessel or ship, a vehicle, a tract of land, a national border, a golf course, or any other type of location, in real time, and react to an event with a contemporaneous, real time response, such as a recorded message or a sound bite, a sudden or blinding illumination of light, spraying from a water cannon or a fire hose, and other possible responses to drive away burglars or trespassers.

Another advantage of the present system is that the present system, through allowing both remote monitoring and remote, contemporaneous reactions to on-site events, can allow a single remote user to effectively monitor and secure one or more remote locations of any size easily and inexpensively, reducing costs and manpower, while providing improved and effective security. The present system thereby can prevent costly loss and damage of property and can potentially save lives by preventing undesired entry, theft, or damage of occupied property.

The present system can also be advantageously installed as a backup system, to be used when existing monitoring systems fail due to mechanical error, user error, or natural disaster. Through use of a satellite network, the present system can be used even when no cellular or wireless signals can be received or transmitted.

The present system has the advantage of being fast to install, capable of continuous monitoring, and remotely fixable at all times. It is contemplated that installation of the present system cam be achieved within twelve hours, however smaller or larger applications of the present system may require smaller or larger amounts of time to install, respectively.

The present system further allows for a variety of reactions to events at a remote location, including non-adversarial reactions such as providing greetings, access, illumination to provide visibility, and similar reactions.

The present system can also be used to monitor and react to a wide variety of events within a wide variety of locations, including property boundaries, hunting grounds, construction sites, residences, military sites, and other locations. It can be used on ships, including ships at sea, with satellite network connectivity.

The present system comprises on premises surveillance equipment, which can include one or more cameras, such as a VTC-IRHCM1 or VTK-IR600/4215 infrared camera from Vitek of Valencia, Calif., one or more microphones, such as a VERIFACT A microphone from Louroe, of Van Nuys, Calif., one or more speakers, such as a MPI-38 speaker from GE Security of Brandenton, Fla., one or more lights, such as a 5318WH light from Heath Zenith of San Diego, Calif., one or more water cannons, such as a Lexan Combo Nozzle from Kidde Firefighting of Exton, Pa., or combinations thereof.

It is contemplated that video and audio equipment can detect events on a premises, such as a home, a naval compound, a yacht, an automobile, a wildlife preserve, a golf course, or any other type of location. Equipment such as speakers, lights, and water cannons can then be used to respond to one or more events on the premises in real time, within a few seconds of the event happening that is being monitored.

The one or more cameras could include color cameras, web cameras such as an AXIS 223M web camera from Axis Communications, of Chelmsford Mass., or a DCS-3420 web camera from DLink of Fountain Valley, Calif., tilt, pan, and zoom cameras, such as a VT-PTZ18 camera, from Vitek of Valencia, Calif., black an white cameras, such as a VTC-EB25C black and white camera from Vitek of Valencia, Calif., or combinations of these cameras. It is contemplated that underwater cameras such as an Atlantis AUW-552 underwater camera from JJ Communications of Englewood, N.J., or infrared cameras, such as a VTC-IRHCM1 infrared camera from Vitek of Valencia, Calif., can be used, as well.

The present system further comprises an on premises wireless server, such as a WRT54G3G-ST wireless, server from Linksys of Irvine, Calif., or a JB-110 wireless router from Junxion of Seattle Wash., having a first router, in communication with the on premises surveillance equipment. The on premises wireless server can be a cellular or non-cellular server. A server with Wi-FI plus a cellular card, such as a Merlin S720 cellular card, from Sprint, of Houston, Tex., would be possible embodiments. It is contemplated to use a cellular card produced or provided by a company that owns a cellular network for use with the present system so that the user can easily be provided with as much bandwidth as needed.

Any amount of bandwidth could be used by the present system, depending on the number of premises to be monitored and the number of users accessing the system. It is contemplated that more than 30 gigabytes per month of bandwidth can be useable with the present invention for a significant number of users, such as eight, ten, or sixteen users.

The on premises wireless server can be used to receive a first surveillance data from the on premises surveillance equipment, such as an image or sound detected by the on premises surveillance equipment. For example, the first surveillance data can be obtained using cameras monitoring a school, so that drug sellers can be detected. Surveillance cameras can also be used at construction sites, day or night, to detect theft or fraud occurring on-site.

It is contemplated that about 4000 bytes per second can be transmitted and received by the on premises wireless server. However, much larger or smaller rates of transmission are contemplated, depending on the number of premises to be monitored, the number of users accessing the system, and the availability and cost of technology.

The on premises wireless server can then be used to transmit the first surveillance data. In an embodiment, the first surveillance data can be a streaming digital signal, a streaming analog signal, a sequence of still photographic images, such as images taken quickly by a digital camera, or combinations thereof.

The on premises surveillance equipment, the on premises wireless server, or combinations thereof can be elevated or mounted, such as on poles, structures, trees, bridges, a mobile structure, such as a crane, or other objects. It is contemplated that the on premises surveillance equipment and the on premises wireless server can be mounted on poles at least sixteen feet in height, and as tall as 100 feet in height. The poles can be grounded for enhanced safety.

It is contemplated that the on premises surveillance equipment can be mounted such that it is elevated to at least sixteen feet in height, by burying a twenty foot pole four feet into the ground, then mounting the on premises surveillance equipment on the sixteen foot portion of the pole protruding above the ground. However, the on premises surveillance equipment could be mounted at any height, such as forty feet.

Lightening arrestors can be used when the on premises surveillance equipment or the on premises wireless server is mounted on poles of at least sixteen feet. Surge suppressors can also be used to protect the on premises surveillance equipment and the on premises wireless server from power surges.

The on premises wireless server can include inputs for video cameras, including pan, tilt, and zoom cameras, an Ethernet port for local viewing of the attached cameras, a slot to house an "EV-DO air card," and connections for other kinds of equipment.

The on premises wireless server can be housed inside a weatherproof fiberglass enclosure, such as when located out of doors. Other kinds of enclosures or housings can also be used. An enclosure could include cooling fans to maximize airflow within the enclosure, and a power supply, such as a VT-24AC/50 or VT-12DC/50 power supply, from Vitek of Valencia, Calif. The power supply can be a 110 source from a power grid. The power supply can also be a solar powered panel for driving the server, such as a GP Solar RV10KT, from Alternative Energy of Hudson, Mass. It is contemplated that the power supply utilized can vary as necessitated by the cameras and surveillance equipment selected.

The on premises wireless server can be a wireless router with a video card, such as a Linksys router with a PCMCIA video card.

On premises surveillance equipment can be attached to the enclosure or to the on premises wireless server. The on premises surveillance equipment can also be separately mounted elsewhere throughout the premises to be monitored. The on premises wireless server or on premises surveillance equipment can include one or more antennas, such as 3 db external antennas, for transmitting data.

The present system further comprises an authenticating virtual private network that is in communication with the on premises wireless server. An authenticating virtual private network provides enhanced security and speed compared to other kinds of networks. It is contemplated that the authenticating virtual private network can be protected using 128 bit encryption.

A plurality of on premises wireless servers and a plurality of on premises surveillance equipment could be in communication with a single authenticating virtual private network, such as to monitor eighteen holes of a golf course simultaneously. Multiple authenticating virtual private networks could also be in communication with one or more on premises wireless servers.

Similarly, a plurality of on premises surveillance equipment could be in communication with a single on premises wireless server. It is also contemplated that one or more on premises wireless servers that are integral with a camera could be used.

A second router, which can preferably have a firewall, and which is remote from the on premises surveillance equipment, is in communication with the authenticating virtual private network and with a second network, such as the internet, or a local area network. The router can be adapted for receiving the first surveillance data from the on premises wireless server, directing the first surveillance data to one or more networked servers having one or more internet protocol addresses and having data storage, and transmitting a second surveillance data to the on premises wireless server.

The second surveillance data can be a response to the first surveillance data, such as selecting a sound bite and transmitting the sound bite to the premises, or selecting a different reaction, such as activating one or more lights or water cannons. The second surveillance data can also be transmitted independent of the first surveillance data, such as instructions to activate, deactivate, or reposition one or more pieces of on premises surveillance equipment. For example, a remote viewer may transmit second surveillance data to cause a camera to rotate to better view a different part of a premises.

It is contemplated that in lieu of the one or more networked servers, conventional data storage, such as a computer or digital video recorder having data storage, could also be used, such as when the number of premises to be monitored and the number of users accessing the system are small.

The second network can be encrypted or provided with a firewall to enhance security.

The present system can be designed to enable an administrator to access the on premises wireless server locally, or remotely, from a client device, such as a lap top computer, a personal computer, a cellular telephone, a personal digital assistant, or other client devices, to monitor the server and manage any failures in the system, such as by rebooting or reinitializing the system.

A distinct advantage of the present system is that an administrator can install the system remotely, view the system remotely, fix the system remotely, and perform other functions remotely, such as renaming, readdressing, rebooting, or reprogramming the sequence of cameras for recording. For example, a video input of the second router of the second server can be remotely reallocated to different pieces of on premises surveillance equipment by a remote administrator, instantaneously and in real time.

The present system can further include one or more client devices, such as computers, including laptop computers, personal digital assistants, cellular telephones, and other devices, which are in communication with the second network for accessing the one or more networked servers and obtaining the first surveillance data from the one or more networked servers. Any device similar to a personal computer, with a high speed internet connection can be used.

One or more client devices can be located remote from the premises or the one or more networked servers. A client device could be in a different country than the premises being monitored. For example, a camera could monitor a premises located in the United States, while a user in the Netherlands could remotely monitor the premises using a client device.

A plurality of client devices could connect to the second network through multiple gateway protocols simultaneously. For example, a single user could simultaneously access the second network using both a cellular telephone and a personal computer, or multiple users could simultaneously access the second network through multiple gateway protocols.

It is contemplated that the first surveillance data could be enhanced or altered to improve visibility and clarity of video images, clarity of audio data, and to improve other characteristics of the first surveillance data. For example, the brightness, contrast, and coloration of a video image monitored by the on premises surveillance equipment can be manipulated by a user viewing the video image to better visualize the event being monitored.

The present system can further include computer instructions resident in the data storage of the one or more networked servers for enabling the client devices to connect to the at least one networked server, select at least one sound bite stored in the data storage of the at least one networked server, and transmit the at least one sound bite to the on premises surveillance equipment.

A sound bite could be a barking dog, an alarm sound, a selection from a drop down menu of spoken authoritative statements such as, "we have called the police" or "step away from the vehicle," or any other type of sound. Alternatively, instead of selecting a sound bite, a different reaction could be selected, such as illuminating the premises with one or more lights, spraying an area with one or more water cannons, or silently sounding an alarm for contacting law enforcement personnel.

In an embodiment, the system is encrypted and authenticated. In a contemplated embodiment, the system can be used on a network that receives about 50-70 kilobytes of data per second, having download speeds of 400 to 700 kilobytes per second. However, the system is contemplated to send and receive data as rapidly as a network provider can allow. Download speeds of one megabyte and over are contemplated herein.

In another contemplated embodiment, the system can include a wireless network between the authenticating virtual private network and the second network. The wireless network can be any type of wireless network, including a cellular network, a satellite network, or another type of network.

It is further contemplated that the authenticating virtual private network can be a cellular virtual private network or a satellite network.

A second embodiment of the present system relates to a wireless cellular system for detecting, monitoring, and reacting to an event.

As described above, on premises surveillance equipment, such as cameras, microphones and speakers, lights, water cannons, and other equipment, that has been integrated with cellular transmission equipment, such as antennae, integral servers, or cellular cards, is used to monitor a remote location. In this embodiment, the on premises surveillance equipment is in communication with a on premises cellular wireless server, having a first router, for receiving a first surveillance data from the on premises surveillance equipment and transmitting the first surveillance data.

The on premises cellular wireless server is in communication with a cellular public network. A router, preferably having a firewall, remote from the on premises surveillance equipment, is in communication with the cellular public network and with a second network, and is adapted for receiving the first surveillance data from the on premises wireless server, directing the first surveillance data to at least one networked server having an internet protocol address and data storage, and transmitting a second surveillance data to the on premises cellular wireless server.

As described in other embodiments, one or more client devices, including cellular client devices, can be in communication with the second network for accessing the one or more networked servers and obtaining the first surveillance data from the at least one networked server.

This embodiment of the system can also include computer instructions resident in data storage of the one or more networked servers for enabling one or more client devices to connect to the networked server, select at least one sound bite stored in the at least one networked server, and transmit the at least one sound bite to the on premises surveillance equipment for reacting to a viewed event within a few seconds.

Another embodiment of the present system relates to a system for detecting, monitoring, and reacting to an event on a ship.

This embodiment of the present system utilizes on ship surveillance equipment, which can include the similar equipment to the land based embodiments of the present system, adapted for water resistance, and to survive exposure to salt and a corrosive marine environment.

The embodiment of the present system can further include an on ship wireless server having a first router in communication with the on ship surveillance equipment for receiving a first ship data from the on ship surveillance equipment and transmitting the first ship data. The on ship wireless server can be adapted to receive and transmit video signals, audio signals or combinations thereof. The first ship data can be a streaming analog signal, a streaming digital signal, a sequence of discrete photos, or combinations thereof.

It is contemplated that the on ship wireless server can be enclosed, mounted, such as on a mast of a ship, or both enclosed and mounted, as described in other embodiments.

This embodiment of the present system can further include a satellite network, such as the Inmarsat I-4 network, or a similar network, in communication with the on ship wireless server. It is contemplated that the satellite network could be accessed from any location, including when the ship is at sea.

It is further contemplated that a plurality of on ship wireless servers and a plurality of on ship surveillance equipment could access a single satellite network. A plurality of on ship surveillance equipment could be in communication with a single on ship wireless server. It is also contemplated that one or more on ship wireless servers could be integral with a camera.

This embodiment of the system can further include a router that is remote from the on ship surveillance equipment, which is in communication with the satellite network and with a second network. The router can be located on land, at sea, under water, or on another vessel. The second network can be adapted for receiving the first ship data from the on ship wireless server, directing the first ship data to at least one networked server having an internet protocol address, and transmitting a second ship data to the on ship wireless server.

As described previously, the second ship data can be transmitted in response to the first ship data, or independent from the first ship data, and can instruct the on ship surveillance equipment to activate, deactivate, move, react to an event occurring on the ship, or perform other similar functions.

As described in previous embodiments of the present system, one or more client devices can be connected to the second network for accessing the one or more networked servers and obtaining the first ship data from the one or more networked servers. It is contemplated that multiple client devices can connect through multiple gateway protocols simultaneously.

This embodiment of the system can further include computer instructions resident in data storage of the one or more networked servers for enabling the client devices to connect to the one or more networked servers, select at least one sound bite stored in the at least one networked server, and transmit the sound bite to the on ship surveillance equipment.

As described in previous embodiments, the sound bite can be any kind of sound, including animal noises, alarms, or spoken phrases. Other reactions besides sound bites, such as illumination, spraying by water cannons, or non-adversarial reactions such as greetings could be selected.

It is contemplated that this embodiment of the system can be encrypted.

It is further contemplated that this embodiment of the system can include a wireless network between the satellite network and the second network.

Referring now to FIG. 1, a schematic drawing displaying the components of an embodiment of the present system relating to surveillance of a premises is depicted.

Premises 5 contains numerous on premises surveillance equipment. Premises 5 contains first camera 10 and second camera 11. It is contemplated that any number of cameras could be used, such as when a full 360 degrees of visibility are desired. In a preferred embodiment, from two cameras to twelve cameras can be used.

Premises 5 also includes microphone 13, speaker 16, light 21, and water cannon 23.

On premises wireless server 14, also located within premises 5, includes first router 12, which is in communication with first camera 10, second camera 11, microphone 13, speaker 16, light 21, and water cannon 23. First camera 10, second camera 1, microphone 13, speaker 16, light 21, and water cannon 23 can be physically attached to on premises wireless server 14, such as by welding, bolts, brackets, or other fasteners or fastening methods, or located remote from on premises wireless server 14, communicating with first router 12 using wireless means, such as one or more antenna.

In an embodiment, on premises wireless server 14 can be an on premises cellular wireless server.

First router 12 of on premises wireless server 14 is adapted to receive first surveillance data 15, which can be any kind of data, including audio or video data, from first camera 10, second camera 11, or microphone 13. It is contemplated that on premises wireless server 14 can receive first surveillance data 15 from other types of equipment as well. On premises wireless server 14 is further adapted to transmit first surveillance data 15.

Authenticating virtual private network 18 is in communication with on premises wireless server 14. Wireless network 36 can also be in communication with authenticating virtual private network 18. Wireless network 36 is depicted in communication with a second router 19, which can have a firewall 99. Second router 19 is in communication with wireless network 36 and second network 20. Wireless network 36 could also be omitted, however, and authenticating virtual private network 18 could be in communication with second router 19 directly.

In an embodiment, authenticating virtual private network 18 can be a cellular virtual private network. In another contemplated embodiment, authenticating virtual private network can be a satellite network.

Second router 19 is adapted for receiving first surveillance data 15 from on premises wireless server 14, and directing first surveillance data 15 to first networked server 22a and second networked server 22b. Any number of networked servers could be in communication with second router 19, however FIG. 1 depicts two networked servers. Second router 19 is also adapted for transmitting second surveillance data 17 over wireless network 36 and authenticating virtual private network 28 to first router 12 of on premises wireless server 14.

First networked server 22a has an internet protocol address 24 and data storage 32.

Computer instructions 30 are depicted resident in data storage 32 of first networked server 22a. Computer instructions 30 are for enabling at least one client device to connect with first networked server 22a, to select a sound bite 34, which is also resident in data storage 32 of first networked server 22a, and to transmit sound bite 34 to premises 5, to be broadcast using speaker 16. In lieu of a sound bite, it is contemplated that computer instructions 30 could also activate light 21 or water cannon 23, or perform other possible reactions to an event occurring in premises 5.

Second networked server 22b can be a secondary or remote networked server, which can contain data storage, an internet protocol address, computer instructions, and a sound bite in the same manner as first networked server 22a.

First client device 26, second client device 27, and third client device 28 are depicted in communication with second network 20 for accessing first networked server 22a to obtain first surveillance data 15 from first networked server 22a.

First client device 26, second client device 27, and third client device 28 can be any type of client device, including computers, cellular telephones, personal digital assistances, and other devices. A user using first client device 26, second client device 27, or third client device 28 can monitor first surveillance data 15, received from on premises wireless server 14, and select a sound bite 34, or another reaction in response to the first surveillance data 15. Sound bite 34, of another reaction or response to an event can be transmitted as part of second surveillance data 17.

First client device 26, second client device 27, and third client device 28 can simultaneously access second network 20 through first gateway protocol 38 and second gateway protocol 40. Any number of client devices could be used to simultaneously access second network 20 through any number of gateway protocols.

It is contemplated that first client device 26, second client device 27, third client device 28, or any combination thereof could be located in any location remote from premises 5, including other countries, while still able to monitor premises 5 through first camera 10, second camera 11, and microphone 13, and select reactions to events within premises 5.

Administrator 98 can access second network 20 through first gateway protocol 38, using third client device 28, as depicted in FIG. 1. It is contemplated that administrator 98 can also use any other gateway protocol or client device to access second network 20. It is contemplated that administrator 98 can remotely readdress, reallocate, rename, or reboot the present system, such as reallocating first camera 10 or second camera 11 to a different input of second router 19.

Figure 2:
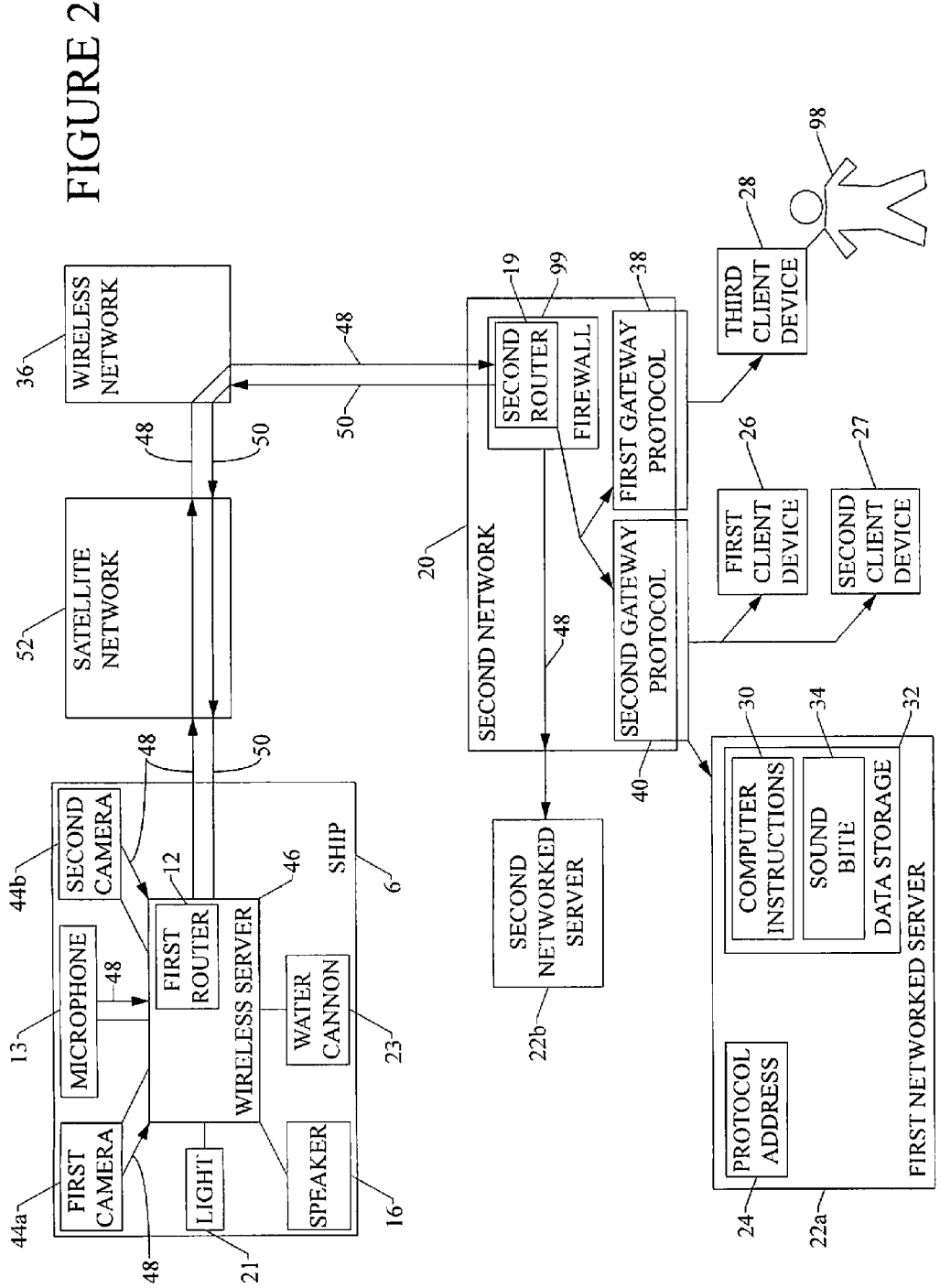
FIG. 2 depicts a diagram displaying the components of an embodiment of the present system relating to surveillance of a ship.

Referring now to FIG. 2, a schematic drawing displaying the components of an embodiment of the present system relating to surveillance of a ship is depicted.

Ship 6 contains first ship camera 44a, second ship camera 44b, microphone 13, speaker 16, light 21, and water cannon 23.

On ship wireless server 46, also located within ship 6, having a first router 12, is in communication with first ship camera 44a, second ship camera 44b, microphone 13, speaker 16, light 21, and water cannon 23. First ship camera 44a, second ship camera 44b, microphone 13, speaker 16, light 21, and water cannon 23b can be physically attached to on ship wireless server 46, such as by welding, bolts, brackets, or other fasteners or fastening methods, or positioned remote from on ship wireless server 46 and in communication with on ship wireless server 46 using wireless means, such as one or more antennas.

First router 12 of on ship wireless server 46 is adapted to receive first ship data 48, which can be any kind of data, including audio or video data from first ship camera 44a, second ship camera 44b, or microphone 13, or other kinds of data from other equipment. On ship wireless server 46 is further adapted to transmit first ship data 48.

Satellite network 52 is in communication with on ship wireless server 46. Wireless network 36 can also be in communication with satellite network 52. Wireless network 36 is depicted in communication with a second router 19, depicted having a firewall 99, and that is in communication with wireless network 36 and second network 20. Wireless network 36 could also be omitted, however, and satellite network 52 could be in communication with second router 19 directly.

Second router 19 is adapted for receiving first ship data 48 from on ship wireless server 46, and directing first ship data 48 to first networked server 22a and second networked server 22b. Any number of networked servers could be in communication with second router 19, however FIG. 2 depicts two networked servers. Second router 19 is also adapted for transmitting second ship data 50 over wireless network 36 and authenticating virtual private network 28 to first router 12 of on ship wireless server 46.

First networked server 22a is depicted having an internet protocol address 24 and data storage 32. Second networked server 22b can be a secondary or remote networked server, which can contain data storage, an internet protocol address, computer instructions, and a sound bite in the same manner as first networked server 22a.

Computer instructions 30 are depicted resident in data storage 32 of first networked server 22a. Computer instructions 30 are for enabling at least one client device to connect with first networked server 22a, to select a sound bite 34, which is also resident in data storage 32 of first networked server 22a, and to transmit sound bite 34 to ship 6, for broadcast using speaker 16. In lieu of a sound bite, other reactions such as activating light 21 or water cannon 23 could selected, in addition to other possible reactions to an event occurring on ship 6.

First client device 26, second client device 27, and third client device 28 are depicted in communication with second network 20 for accessing first networked server 22a to obtain first ship data 48 from first networked server 22a.

First client device 26, second client device 27, and third client device 28 can be any type of client device, including computers, cellular telephones, personal digital assistants, and other devices. A user using first client device 26, second client device 27, or third client device 28 can monitor first ship data 48, received from on ship wireless server 46, and select a sound bite 34, or another reaction in response to the first ship data 48. Sound bite 34 can be transmitted as part of second ship data 50.

First client device 26, second client device 27, and third client device 28 can simultaneously access second network 20 through first gateway protocol 38 and second gateway protocol 40. Any number of client devices could be used to simultaneously access second network 20 through any number of gateway protocols.

It is contemplated that first client device 26, second client device 27, third client device 28, or any combination thereof could be located in any location remote from ship 6, including other countries, while still able to monitor ship 6 through first ship camera 44a and second ship camera 44b and select reactions to events within ship 6. It is also contemplated that ship 6 could be in any location, including points in the ocean, and still be remotely monitored by a user.

Administrator 98 can access second network 20 through first gateway protocol 38, using third client device 28, as depicted in FIG. 2. It is contemplated that administrator 98 can also use any other gateway protocol or client device to access second network 20. It is further contemplated that administrator 98 can remotely readdress, reallocate, rename, or reboot the present system, such as reallocating first ship camera 44a or second ship camera 44b to a different input of second router 19.

It is further contemplated that through satellite network 52, ship 6 can be monitored, and events within ship 6 can be reacted to when ship 6 is at any location, including a dock or port in any country or any point in the ocean.

Figure 3:
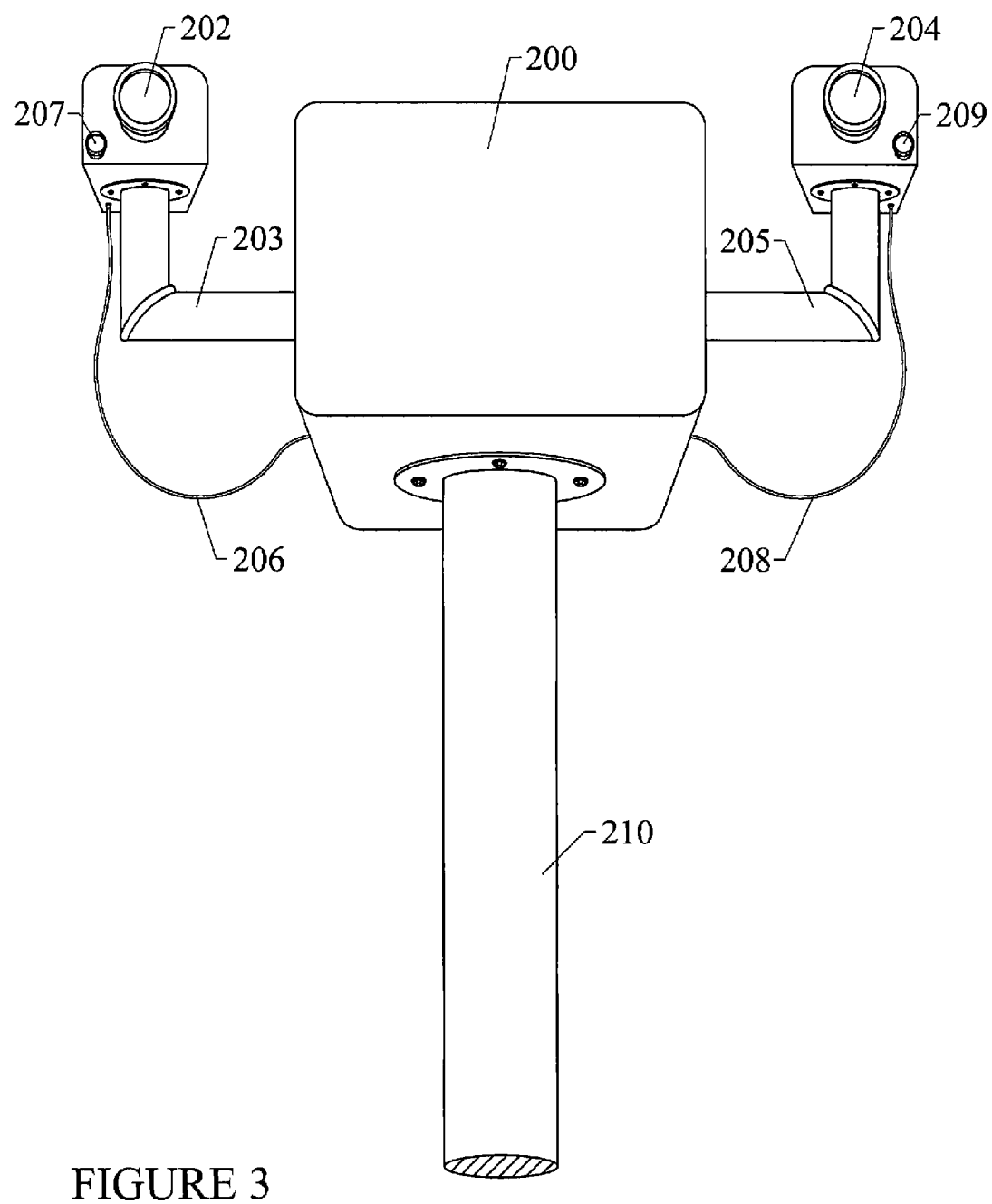
FIG. 3 depicts an exterior view of an embodiment of on premises surveillance equipment and an enclosed on premises wireless server useable with the present system.

Referring now to FIG. 3, an embodiment of on premises surveillance equipment and an enclosed on premises wireless server is depicted.

Enclosure 200, which can be a weatherproof fiberglass enclosure or another kind of enclosure, is affixed to pole 210, such as by welding, bolting, or other attachment means. Pole 210 can be formed from any material, including metal, wood, fiberglass, and other similar materials. Pole 210 can be weather resistant. It is contemplated that pole 210 can be any height necessary to survey a premises, but in a contemplated embodiment, pole 210 can range from sixteen to one hundred feet in height.

First camera 202 and second camera 204 are depicted attached to enclosure 200. First camera 202 and second camera 204 can be any kind of camera, as previously described. FIG. 3 depicts first camera 202 attached to enclosure 200 via first arm 203 and second camera 204 attached to enclosure 200 via second arm 205, however first camera 202 and second camera 204 can be attached to enclosure 200 using other means, and in other locations on enclosure 200. First camera 202 and second camera 204 can also be located remote from enclosure 200. In such an embodiment, it is contemplated that first camera 202 and second camera 204 are adapted for wirelessly transmitting surveillance data.

First cabling 206 and second cabling 208 connect first camera 202 and second camera 204 to enclosure 200, respectively. First cabling 206 and second cabling 208 can include cabling to transmit surveillance data recorded by first camera 202 and second camera 204 to a server within enclosure 200. First cabling 206 and second cabling 208 can also include cabling to supply power to first camera 202 and second camera 204, however power can be supplied to first camera 202 and second camera 204 through other means as well, such as solar panels, internal batteries, or a separate power cable.

First camera 202 and second camera 204 are depicted having first lights 207 and second lights 209, respectively, for illuminating and visualizing a premises during periods of darkness and limited visibility. First camera 202 and second camera 204 can have any number of lights, including zero lights.

Figure 4:
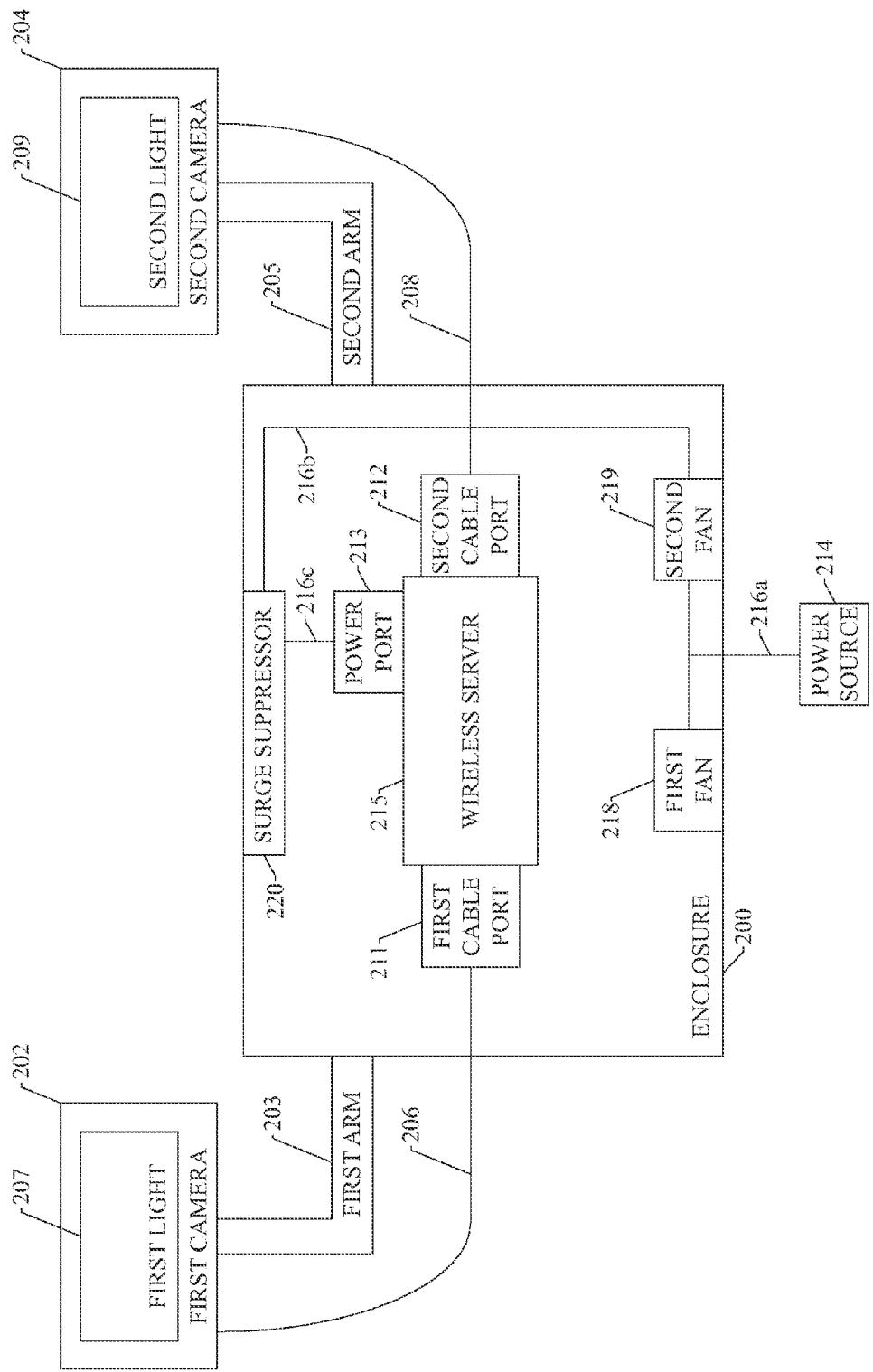
FIG. 4 depicts an interior schematic view of an embodiment of on premises surveillance equipment and an on premises wireless server useable with the present system.

Referring now to FIG. 4, an interior schematic view of an embodiment of on premises surveillance equipment and an on premises wireless server useable with the present system is depicted.

As previously described, enclosure 200 is connected to first camera 202 by first am 203, and to second camera 204 by second arm 205. First camera 202 has first lights 207, and second camera 204 has second lights 209.

On premises wireless server 215 is contained within enclosure 200. On premises wireless server 215 can be any kind of server, and can have a router with or without a firewall. On premises wireless server 215 is adapted to wirelessly transmit surveillance data over a network to one or more off-premises locations.

On premises wireless server 215 has a first cable port 211 and a second cable port 212. First cable port 211 of on premises wireless server 215 is connected to first cable 206. First cable 206 can thereby communicate surveillance data from first camera 202 to on premises wireless server 215. Second cable port 212 of on premises wireless server 215 is connected to second cable 208. Second cable 208 can thereby communicate surveillance data from second camera 204 to on premises wireless server 215.

On premises wireless server 215 is also depicted having a power port 213. Power port 213 is depicted connected to surge suppressor 220, which can be any kind of surge suppressor, surge protector, power strip, or similar device for both conducting power from a power source to on premises wireless server 215 and for protecting on premises wireless server 215 and other contents of enclosure 200 from damage due to power surges.

Enclosure 200 is further depicted containing first fan 218 and second fan 219. First fan 218 and second fan 219 serve to maximize air flow within enclosure 200 and regulate the temperature of on premises wireless server 215 and other contents of enclosure 200, preventing overheating of system components. It is also contemplated that when installing the present system in certain climates Power source 214 is depicted connected to first power cable 216a. First power cable 216a connects power source 214 to first fan 218 and second fan 219. Second power cable 216b connects second fan 219 to surge suppressor 220. Third power cable 216c connects surge suppressor 220 to power port 213 of on premises wireless server 215. Other configurations of cabling and connections are contemplated. Any configuration of cabling and connections that supplies power to each component of enclosure 200 can be used.

Power source 214 can be any kind of power source, including one or more solar panels, one or more batteries, a 110 source from a power grid, or other power supplies.

While these embodiments have been described with emphasis on the embodiments, it should be understood that within the scope of the appended claims, the embodiments might be practiced other than as specifically described herein.

What is claimed is:

1. A system for detecting, monitoring, and reacting to an event, comprising:
   on premises surveillance equipment;
   an on premises wireless server having a first router in communication with the on premises surveillance equipment for receiving a first surveillance data from the on premises surveillance equipment and transmitting the first surveillance data;

an authenticating virtual private network in communication with the on premises wireless server;

a second router with a firewall remote from the on premises surveillance equipment in communication with the authenticating virtual private network and with a second network adapted for receiving the first surveillance data from the on premises wireless server, directing the first surveillance data to at least one networked server with an IP address and data storage, and transmitting a second surveillance data to the on premises wireless server;

at least one client device in communication with the second network for accessing the at least one networked server and obtaining the first surveillance data from the at least one networked server, and computer instructions resident in the data storage of the at least one networked server for enabling the at least one client device to connect to the at least one networked server for detecting and monitoring in real time events at a remote location using a wireless network.

2. The system of claim 1 further comprising computer instructions resident in data storage of the at least one networked server for enabling the at least one client device to select at least one sound bite stored in the data storage of the at least one networked server, and transmit the sound bite to the on premises surveillance equipment.

3. The system of claim 1, wherein the on premises surveillance equipment comprises at least one camera, at least one microphone, at least one speaker, at least one light, at least one water cannon, at least one fire hose, or combinations thereof.

4. The system of claim 3, wherein the at least one camera is a color camera, a web camera, an infra red camera, a tilt, pan, and zoom camera, a black and white camera, an explosion proof camera, an underwater camera, or combinations thereof.

5. The system of claim 3, wherein the on premises surveillance equipment comprises from two cameras to twelve cameras.

6. The system of claim 1, wherein the first surveillance data comprises a streaming analog signal, a streaming digital signal, a sequence of discrete photos, or combinations thereof.

7. The system of claim 1, wherein the system is encrypted.

8. The system of claim 1, further comprising a wireless network between the authenticating virtual private network and the second network.

9. The system of claim 1, wherein at least two client devices can connect to the at least one networked server through at least two gateway protocols simultaneously.

10. The system of claim 1, wherein a plurality of on premises surveillance equipment is in communication with the on premises wireless server.

11. The system of claim 3, wherein the on premises wireless server is integral with a camera.

12. The system of claim 1, wherein at least one administrator can remotely access the on premises surveillance equipment.

13. A system for detecting, monitoring, and reacting to an event, comprising:

on premises surveillance equipment;

an on premises cellular wireless server having a first router in communication with the on premises surveillance equipment for receiving a first surveillance data from the on premises surveillance equipment and transmitting the first surveillance data;

a cellular public network in communication with the on premises wireless server;

a second router with a firewall remote from the on premises surveillance equipment in communication with the cellular public network and with a second network adapted for receiving the first surveillance data from the on premises wireless server, directing the first surveillance data to at least one networked server with an IP address and data storage, and transmitting a second surveillance data to the on premises cellular wireless server;

at least one client device in communication with the second network for accessing the at least one networked server and obtaining the first surveillance data from the at least one networked server, and computer instructions resident in the data storage of the at least one networked server for enabling the at least one client device to connect to the at least one networked server, select at least one sound bite stored in the data storage of the at least one networked server, and transmit the at least one sound bite to the on premises surveillance equipment for reacting to a viewed event within a few seconds.

14. The system of claim 13, wherein the on premises surveillance equipment comprises at least one camera, at least one microphone, at least one speaker, at least one light at least one water cannon, at least one fire hose, or combinations thereof.

15. The system of claim 14, wherein the at least one camera is a color camera, a web camera, an infra red camera, a tilt, pan, and zoom camera, a black and white camera, an explosion proof camera, an underwater camera, or combinations thereof.

16. The system of claim 14, wherein the on premises surveillance equipment comprises from two cameras to twelve cameras.

17. The system of claim 13, wherein the first surveillance data comprises a streaming analog signal, a streaming digital signal, a sequence of discrete photos, or combinations thereof.

18. The system of claim 13, wherein the system is encrypted.

19. The system of claim 13, further comprising a wireless network between the cellular virtual private network and the second network.

20. The system of claim 13, wherein at least two client devices can connect to the at least one networked server through at least two gateway protocols simultaneously.

21. The system of claim 13, wherein a plurality of on premises surveillance equipment is in communication with the on premises cellular wireless server.

22. The system of claim 14, wherein the on premises cellular wireless server is integral with a camera.

23. The system of claim 13, wherein at least one administrator can remotely access the on premises surveillance equipment.

24. A system for detecting, monitoring, and reacting to an event on a ship, comprising:

on ship surveillance equipment;

an on ship wireless server having a first router in communication with the on ship surveillance equipment for receiving a first ship data and transmitting the first ship data;

a satellite network in communication with the on ship wireless server;

a second router with a firewall remote from the on ship surveillance equipment in communication with the satellite network and with a second network adapted for receiving the first ship data from the on ship wireless server, directing the first ship data to at least one networked server with an IP address and data storage, and transmitting a second ship data to the on ship wireless server;

at least one client device in communication with the second network for accessing the at least one networked server and obtaining the first ship data from the at least one networked server, and computer instructions resident in the data storage of the at least one networked server for enabling the at least one client device to connect to the at least one networked server.

25. The system of claim 24 further comprising computer instructions resident in data storage of the at least one networked server for enabling the at least one client device to select at least one sound bite stored in the data storage of the at least one networked server, and transmit the sound bite to the on ship surveillance equipment.

26. The system of claim 24, wherein the on ship surveillance equipment comprises at least one camera, at least one microphone, at least one speaker, at least one light, at least one water cannon, at least one fire hose, or combinations thereof.

27. The system of claim 26, wherein the at least one camera is a color camera, a web camera, an infra red camera, a tilt, pan, and zoom camera, a black and white camera, an explosion proof camera, an underwater camera, or combinations thereof.

28. The system of claim 26, wherein the on ship surveillance equipment comprises from two cameras to twelve cameras.

29. The system of claim 24, the first ship data comprises a streaming analog signal, a streaming digital signal, a sequence of discrete photos, or combinations thereof.

30. The system of claim 24, wherein the system is encrypted.

31. The system of claim 24, further comprising a wireless network between the satellite network and the second network.

32. The system of claim 24, wherein at least two client devices can connect to the at least one networked server through at least two gateway protocols simultaneously.

33. The system of claim 24, wherein a plurality of on ship surveillance equipment is in communication with the on ship wireless server.

34. The system of claim 26, wherein the on ship wireless server is integral with a camera.

35. The system of claim 24, wherein at least one administrator can remotely access the on ship surveillance equipment.

* * * * *